(12) United States Patent
Fukuhara et al.

(10) Patent No.: US 11,812,178 B2
(45) Date of Patent: Nov. 7, 2023

(54) PHOTOELECTRIC CONVERSION APPARATUS, PHOTOELECTRIC CONVERSION SYSTEM, AND MOVING OBJECT

(71) Applicant: CANON KABUSHIKI KAISHA, Tokyo (JP)

(72) Inventors: Takashi Fukuhara, Tokyo (JP); Takanori Yamashita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/505,049

(22) Filed: Oct. 19, 2021

(65) Prior Publication Data
US 2022/0132070 A1 Apr. 28, 2022

(30) Foreign Application Priority Data
Oct. 23, 2020 (JP) .................... 2020-178126

(51) Int. Cl.
*H04N 25/778* (2023.01)
*H04N 25/75* (2023.01)
*H04N 25/709* (2023.01)
*H04N 25/772* (2023.01)

(52) U.S. Cl.
CPC ......... *H04N 25/778* (2023.01); *H04N 25/709* (2023.01); *H04N 25/75* (2023.01); *H04N 25/772* (2023.01)

(58) Field of Classification Search
CPC ............ H04N 5/37457; H04N 5/3698; H04N 5/37455; H04N 5/378
See application file for complete search history.

(56) References Cited

U.S. PATENT DOCUMENTS

| 2002/0134918 | A1* | 9/2002 | Miida ................. | H03G 3/3084 250/214.1 |
| 2004/0080637 | A1* | 4/2004 | Nakamura ......... | H04N 5/37457 348/E5.041 |
| 2005/0168602 | A1* | 8/2005 | Sumi ................. | H04N 5/37455 348/E3.018 |
| 2012/0138810 | A1* | 6/2012 | Okada ................. | G01T 1/2018 250/394 |
| 2019/0166323 | A1* | 5/2019 | Saito ..................... | H04N 5/378 |

FOREIGN PATENT DOCUMENTS

| JP | 2012134960 A | 7/2012 |
| JP | 2015167347 A | 9/2015 |
| JP | 2017079464 A | 4/2017 |

* cited by examiner

*Primary Examiner* — Nhan T Tran
(74) *Attorney, Agent, or Firm* — CANON U.S.A., INC. IP Division

(57) ABSTRACT

A photoelectric conversion apparatus includes a pixel, an amplifier circuit, a voltage output circuit, and a setting circuit. The setting circuit sets the signal level of a predetermined signal used to acquire a correction value in accordance with an amplification factor set by an amplifier circuit.

19 Claims, 10 Drawing Sheets

PHOTOELECTRIC CONVERSION APPARATUS, PHOTOELECTRIC CONVERSION SYSTEM, AND MOVING OBJECT

BACKGROUND

Technical Field

One disclosed aspect of the embodiments relates to a photoelectric conversion apparatus, a photoelectric conversion system, and a moving object.

Description of the Related Art

Japanese Patent Laid-Open No. 2017-079464 describes an imaging apparatus, which is an example of the photoelectric conversion apparatus. Japanese Patent Laid-Open No. 2017-079464 describes that the amplification factor of an amplifier circuit is set in accordance with the magnitude of a pixel signal. In addition, Japanese Patent Laid-Open No. 2017-079464 describes that a correction value for correcting an amplification factor error is acquired from an output signal obtained by inputting a test voltage into an amplifier circuit.

SUMMARY

According to an aspect of the present disclosure, a photoelectric conversion apparatus includes a pixel, an amplifier circuit, a voltage output circuit, and a setting circuit. The pixel is configured to output a pixel signal in accordance with the amount of incident light. The amplifier circuit is configured to amplify the pixel signal with an amplification factor in accordance with a signal level of the pixel signal. The voltage output circuit is configured to output a predetermined signal to the amplifier circuit. The setting circuit is configured to set a signal level of the predetermined signal in accordance with the amplification factor set by the amplifier circuit.

Further features of the disclosure will become apparent from the following description of exemplary embodiments with reference to the attached drawings.

DESCRIPTION OF THE EMBODIMENTS

According to Japanese Patent Laid-Open No. 2017-079464, the amplification factor set in the amplifier circuit and the signal level of the correction value have not been studied. Therefore, depending on the amplification factor set in the amplifier circuit, the output level of the amplifier circuit may fall outside the range that can be processed by a circuit downstream of following stage of the amplifier circuit, and the accuracy of the obtained correction value may decrease.

In each of the embodiments described below, an image sensing apparatus is mainly described as an example of the photoelectric conversion apparatus. However, the embodiments are not limited to the image sensing apparatus, and can be applied to other examples of the photoelectric conversion apparatus. For example, the embodiments are applicable to a ranging device (a device for measuring a distance using focus detection and TOF (Time Of Flight)), and a photometric device (a device for measuring the amount of incident light).

First Embodiment

Image Sensing Apparatus

Figure 1:
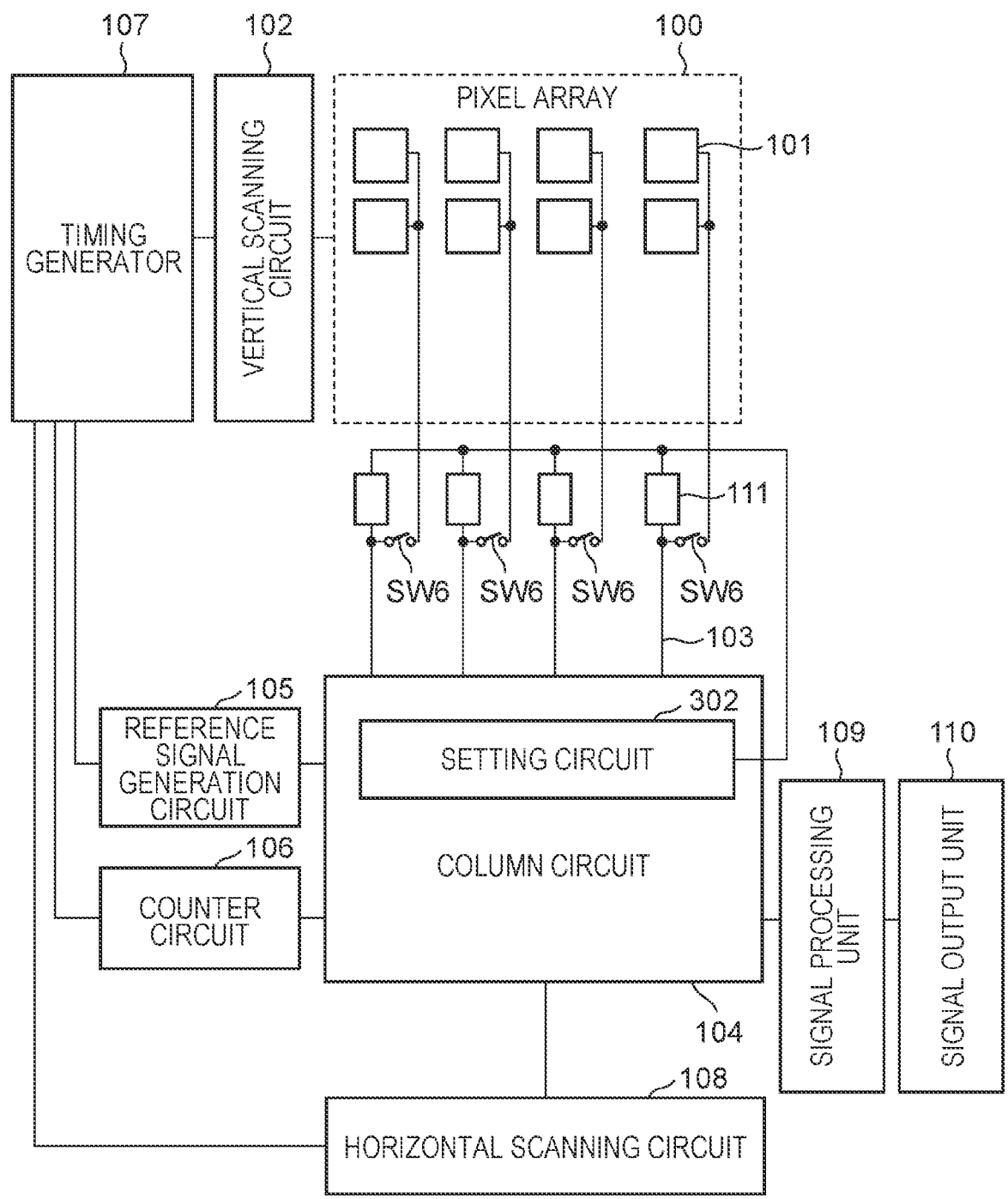
FIG. 1 illustrates the configuration of a photoelectric conversion apparatus.

FIG. 1 is a block diagram of an image sensing apparatus which is an example of a photoelectric conversion apparatus.

Each of pixels 101 is two-dimensionally arranged in a pixel array 100 and outputs a pixel signal to an output line 103 through photoelectric conversion. The photoelectric conversion apparatus includes a voltage output circuit 111 connected to the output line 103 in a similar manner. The voltage output circuit 111 outputs a plurality of predetermined signals having different voltage values.

A vertical scanning circuit 102 scans the pixel array 100 in the vertical direction. As a result, the pixels located in a row selected by the vertical scanning circuit 102 output the pixel signals to the output lines 103. The readout pixel signal is amplified and AD-converted by a column circuit 104. The AD conversion is performed by comparing the voltage value of the pixel signal with the voltage value of a ramp signal that is output from a reference signal generation circuit 105 and that varies with time.

A counter circuit 106 starts a clock pulse counting operation in response to the beginning of a change in the voltage value of the ramp signal. The counter circuit 106 generates a count value through the clock pulse counting operation. The count value is stored in a column memory in the column circuit 104 as an AD conversion value (a digital signal having a value corresponding to the signal level of the pixel signal) on the basis of the time when the level of the ramp signal exceeds the level of the amplified pixel signal. The AD conversion value stored in the column memory is sequentially transferred to a signal processing unit 109, which corrects the AD conversion value by using a horizontal scanning circuit 108. The AD conversion value corrected by the signal processing unit 109 is output to the outside of the image sensing apparatus by a signal output unit 110. A timing generator (hereinafter, also referred to as "TG") 107 controls drive timing synchronization among the circuits described above.

In the correction value acquisition operation required for the correction of the AD conversion value, the pixel 101 and the output line 103 are disconnected through the operation performed by a switch SW6. The voltage output circuit 111 receives a test voltage value input to the output line 103 on the basis of an instruction from a setting circuit 302 in the column circuit 104. The test voltage value is set in accordance with a combination of amplification factors to be switched by an amplifier circuit in the column circuit 104.

Each of the units is described in detail below.

Pixel

Figure 2:
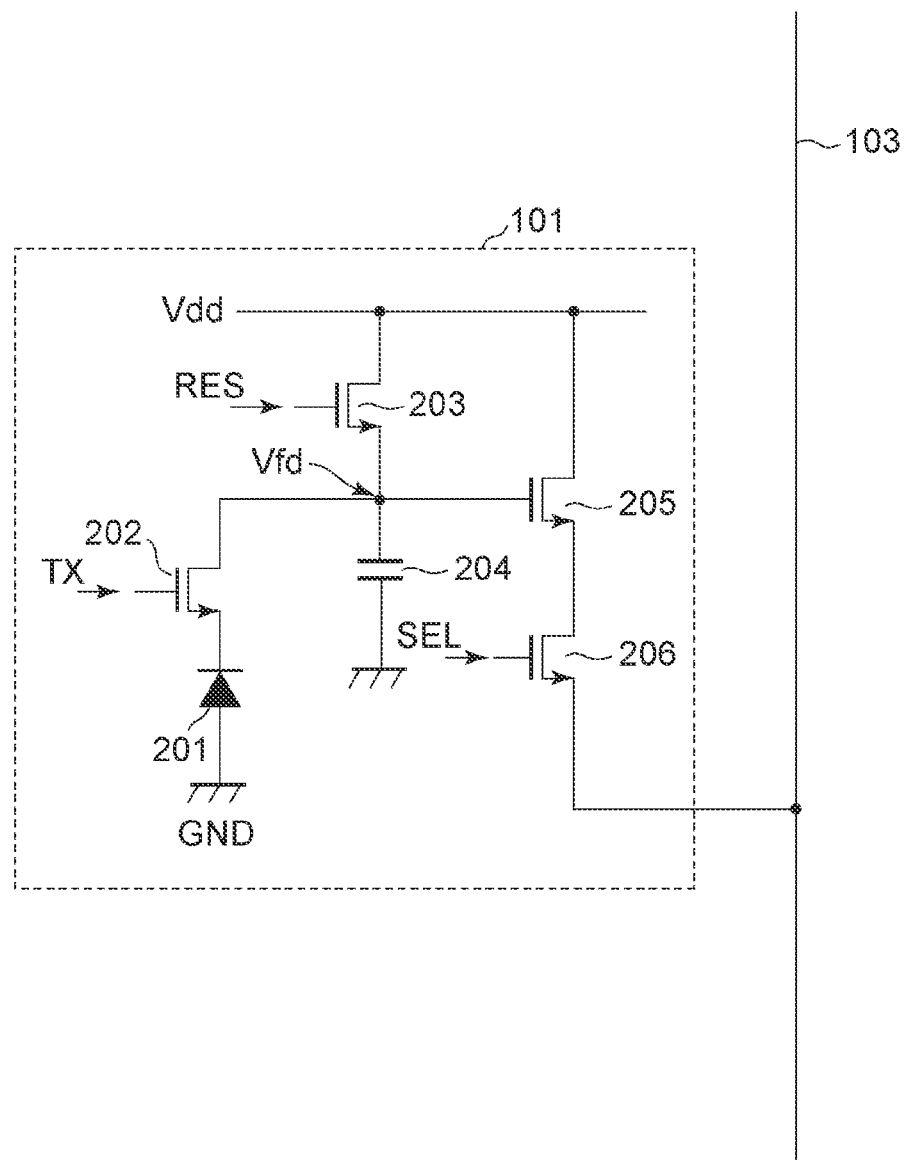
FIG. 2 illustrates the configuration of a pixel.

The configuration of the pixel 101 is described with reference to FIG. 2.

The pixel 101 includes a photodiode 201 (the photoelectric conversion unit), a transfer transistor (a transfer switch) 202, and a reset transistor (a reset switch) 203. Furthermore, the pixel 101 includes a floating diffusion portion 204, an amplifier transistor (a pixel amplification circuit) 205, and a selection transistor (a selection switch) 206. Although each of the switches is illustrated as a MOS transistor in FIG. 2, the switch is not limited to the example, and any element having a switch function, such as a thin film transistor, can be used.

The photodiode 201 generates an electric charge by photoelectrically converting the incident light. The transfer switch 202 transfers the electric charge generated by the photodiode 201 to the floating diffusion portion 204. The floating diffusion portion 204 converts the electric charge transferred through charge-voltage conversion into a voltage value Vfd. The pixel amplification unit 205 functions as a source follower. The gate receives the input voltage value Vfd, the drain is connected to a power supply Vdd, and the source is connected to the selection switch 206. When a corresponding line is selected by a signal SEL, the selection switch 206 enters a conductive state. As a result, the source of the pixel amplification circuit 205 is connected to the output line 103, and the pixel signal is output to the column circuit 104 via the output line 103.

Overall Description of Readout Circuit

Figure 3:
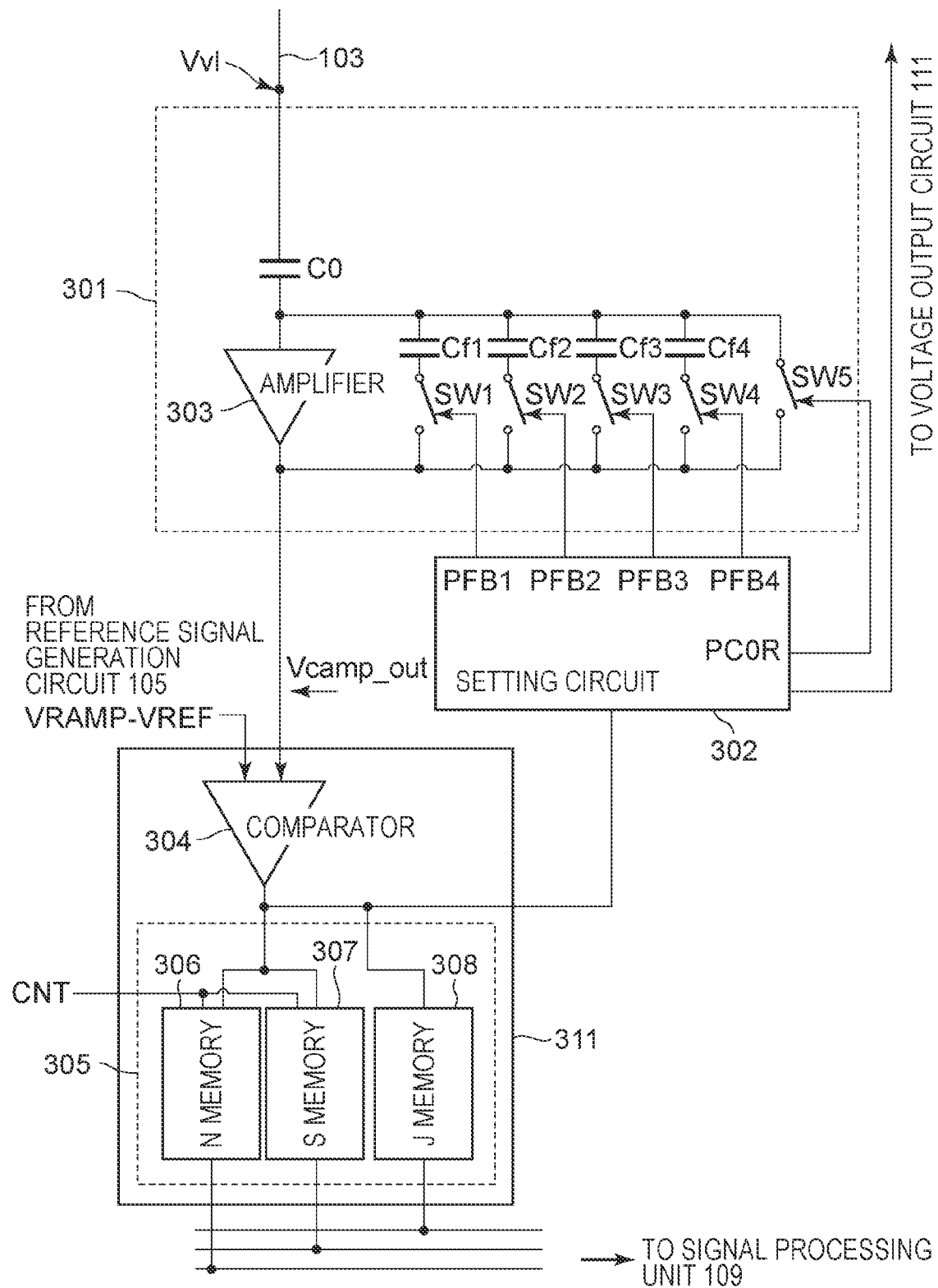
FIG. 3 illustrates the configuration of a readout circuit.

The configuration of the column circuit 104, which is a readout circuit, is described with reference to FIG. 3. FIG. 3 illustrates a column circuit connected to a single pixel column. The column circuit is connected to each of the columns. The column circuit 104 includes an amplifier circuit 301, the setting circuit 302, a comparator 304, and a column memory 305.

The amplifier circuit 301 includes an input capacitance C0, a differential amplifier (hereinafter, also simply referred to as an "amplifier") 303, a plurality of feedback capacitances Cf1, Cf2, Cf3, and Cf4, and switches SW1, SW2, SW3, SW4, and SW5.

The setting circuit 302 controls the switches SW1, SW2, SW3, and SW4, selects any of the feedback capacitances to be connected to the feedback path of the amplifier 303, and changes the capacitance ratio with respect to the input capacitance C0. In this manner, the amplification factor of the amplifier circuit 301 is changed. An example of setting the amplification factor is described below, in which the capacitance value of the input capacitance C0 is set to 8C, and the feedback capacitances Cf1, Cf2, Cf3, and Cf4 are set to C, 3C, 2C, and 6C, respectively.

The set of switches SW1, SW2, SW3, and SW4 forms a parallel capacitance circuit with additive capacitances when the corresponding switches are turned on. By selectively turning on and off one or more switches, a discretely programmable amplification factor may be obtained. As an example, the switch SW1 in the feedback path is turned on, and the other switches in the feedback path are turned off. Then, an amplification factor K1 of the amplifier circuit 301 is K1=C0/Cf1=8. Alternatively, the switches SW1 and SW2 of the feedback path are turned on, and the other switches of the feedback path are turned off. An amplification factor K2 of the amplifier circuit 301 is K2=C0/(Cf1+Cf2)=2. Still alternatively, the switch SW3 of the feedback path is turned on, and the other switches of the feedback path are turned off. The amplification factor K3 of the amplifier circuit 301 is K3=C0/Cf3=4. Yet still alternatively, the switches SW3 and SW4 of the feedback path are turned on, and the other switches of the feedback path are turned off. An amplification factor K4 of the amplifier circuit 301 is K4=C0/(Cf3+Cf4)=1. The switch SW5 is controlled by the PCOR pulse of the control signal output from the TG 107. The capacitances C0, Cf1, Cf2, Cf3, and Cf4 and the amplifier 303 are reset by turning on the switches SW1, SW2, SW3, and SW4 during the feedback in which the switch SW5 is turned on. Among the switches SW1, SW2, SW3, and SW4, at the nodes of the switches that are turned off, a potential drop may occur during the signal output operation performed by the amplifier 303. Accordingly, the off state of the switch may become a weak off state. Even in this case, by resetting the amplifier 303 and the feedback capacitances in advance, the occurrence of an amplification factor change can be avoided even if the off state of the switch becomes a weak off state.

In addition, the setting circuit 302 controls the test voltage value input from the voltage output circuit 111. The details of the operation is described below in the description of a correction of the AD conversion value.

The AD conversion circuit 311 has the comparator 304 and the column memory 305. The signal output from the amplifier circuit 301 and the signal output from the reference signal generation circuit 105 are input to the comparator 304. Hereinafter, the signal output from the amplifier circuit 301 is referred to as an "amplified signal". The reference signal generation circuit 105 outputs a signal having a voltage value the same as a reference voltage VREF (a threshold) during a signal decision period and a ramp signal VRAMP having a voltage value that changes with time during an AD conversion period. During the signal decision period, the comparator 304 compares the reference voltage VREF, which is a reference for the level of the luminance, with an amplified signal Vcamp_out having an amplified pixel signal level. The signal Vcomp_out at this time is a decision signal indicating the result of comparison of the amplified signal and the threshold. The decision signal holds the magnitude relationship information regarding the luminance by using its signal polarity and is input to the column memory 305 and the setting circuit 302. The amplification factor of the amplifier circuit 301 is set on the basis of the signal level of the decision signal. The column memory 305 holds the decision signal Vcomp_out. The decision signal is used to correct an AD output value (described below). In addition, during the AD conversion period, the comparator 304 outputs, to the column memory 305, an AD conversion signal having a signal level that is inverted on the basis of the magnitude relationship between the amplified signal and the ramp signal VRAMP.

Setting of Amplification Factor

An overview of the amplification factor setting operation is described below. The amplification factor setting operation is performed by the amplifier circuit 301, the setting circuit 302, and the comparator 304 during the signal decision period. In the description, two combinations of amplification factors to be switched around are used, one of which is referred to as "setting A" and the other "setting B".

An amplification factor switching operation for the combination of K3=4 and K4=1, which is the setting A, is described first. The setting circuit 302 causes the amplifier circuit 301 to turn on the switch SW3 and, thus, connect the feedback capacitance Cf3 to the feedback path. The amplification factor of the amplifier circuit 301 is set so that K3=4.

During the signal decision period, the comparator 304 compares the output of the amplifier 303 with the reference signal VREF received from the reference signal generation circuit 105 and outputs the decision signal Vcomp_out indicating the result of the comparison. A high level decision signal indicates that the amplified signal has a greater amplitude than the reference signal VREF, while a low level decision signal indicates that the amplified signal has a smaller amplitude than the reference signal VREF. Note that the amplitude of the signal indicates the potential of a target signal relative to the reference potential. The decision signal is output to the setting circuit 302. If the decision signal Vcomp_out is at a high level, the setting circuit 302 turns on the switch SW4 in addition to the switch SW3. As a result, the feedback capacitances Cf3 and Cf4 are both connected to the feedback path. In this way, the setting circuit 302 switches the amplification factor of the amplifier circuit 301 to K4=1. However, if the decision signal is at a low level, the feedback capacitance Cf4 is not connected to the feedback path, and the feedback capacitance Cf3 continues to be connected to the feedback path. Thus, the amplification factor remains unchanged and is set to K3=4. The above is the description of the operation for setting the amplification factor of the amplifier circuit 301 for the setting A.

The amplification factor switching operation for the combination of the amplification factors K1=8 and K2=2, which is the setting B having a higher amplification factor than the setting A, is described below. Typically, the setting B is a setting in which the set ISO sensitivity of the image sensing apparatus is higher than that of the setting A. For the setting B, the setting circuit 302 causes the amplifier circuit 301 to turn on the switch SW1 and connect the feedback capacitance Cf1 to the feedback path. As a result, the amplification factor of the amplifier circuit 301 is set so that K1=8. During the signal decision period, if the decision signal is at the high level, the setting circuit 302 turns on the switch SW2 in addition to the switch SW1. As a result, the feedback capacitance Cf1 and the feedback capacitance Cf2 are connected to the feedback path. In this way, the setting circuit 302 switches the amplification factor of the amplifier circuit 301 to K2=2. However, if the decision signal Vcomp_out is at the low level, the feedback capacitance Cf2 is not connected to the feedback path, and the feedback capacitance Cf1 is continuously connected to the feedback path. Therefore, the amplification factor remains unchanged and is set to K1=8. As described above, the amplification factor setting operation is performed by the amplifier circuit 301 for the setting B.

Furthermore, the setting circuit 302 outputs a test voltage value instruction signal to the voltage output circuit 111 during the correction value acquisition operation in accordance with the combination of amplification factors to be switched around. The details are described below.

AD Conversion

The AD conversion of the amplified signal performed by the AD conversion circuit 311 is described below. The signals from the comparator 304 and the counter circuit 106 are input to the column memory 305. The counter circuit 106 outputs a count signal that is synchronized with the time change in the voltage value of the ramp signal to count the clock pulse. The count signal is input to an N memory 306, which stores the signal level in the reset state of the amplifier circuit 301, and to an S memory 307, which stores the pixel signal level in a light incident state. A change in signal polarity of the AD conversion signal from the comparator 304 occurs at the time when the ramp signal VRAMP exceeds the signal from the amplifier 303 in the reset state or the light incident state during the AD conversion period. These points in time are stored in the memories as an N-level AD conversion value and an S-level AD conversion value, respectively.

In this way, the information stored in the N memory 306, the S memory 307, and the J memory 308 of the column circuit 104 is sequentially output to the signal processing unit 109 by the horizontal scanning circuit 108.

The signal processing unit 109 corrects the AD conversion value on the basis of the information received from the column memory 305. The details are described below.

The corrected AD conversion output is output from the signal output unit 110.

The above is the description of each of the units of the image sensing apparatus.

Timing Diagram

Figure 4:
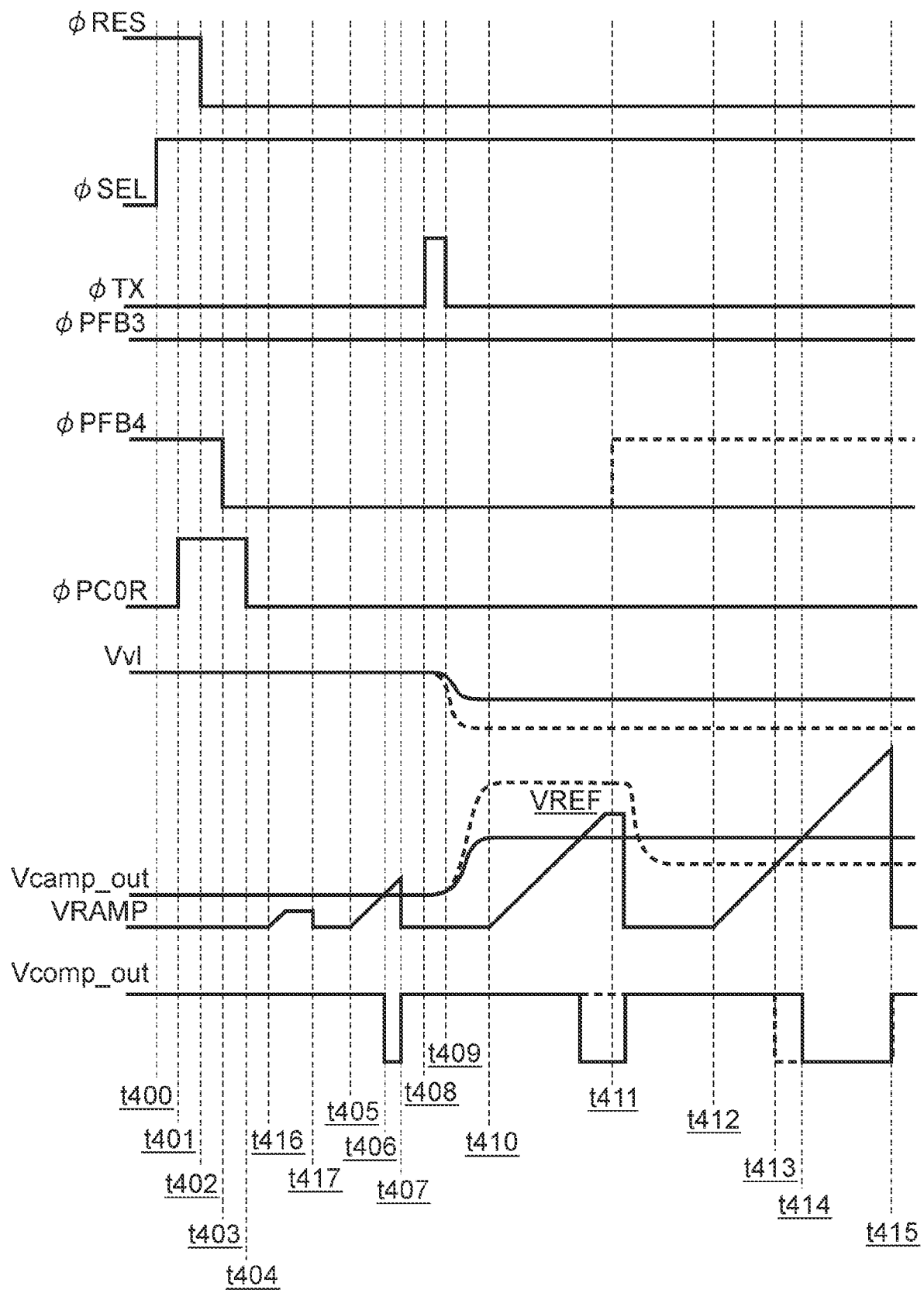
FIG. 4 illustrates the operation performed by the photoelectric conversion apparatus.

The operation performed by the image sensing apparatus before the AD conversion is described below with reference to the timing diagram illustrated in FIG. 4. FIG. 4 is a timing diagram in which the combination of the amplification factors of the amplifier circuit 301 corresponds to the setting A. In the operation, an N level AD conversion period, the signal decision period, and an S level AD conversion period in this order are repeated.

A procedure for obtaining an N-level AD conversion value during the N-level AD conversion period (a period from time points t400 to t407) is described first. At this time, a signal TX input to the pixel 101 keeps the transfer switch 202 off and, thus, the charge accumulated in the PD 201 in accordance with the amount of the incident light is not transferred to the floating diffusion portion 204.

At the time point t400, the row selection switch 206 for starting readout in response to the signal SEL input to the pixel 101 is switched so that the pixel 101 is connected to the output line 103.

From the time points t401 to t404, the switch SW5 is closed by the signal PCOR input to the amplifier circuit 301. During that period, the switches SW1, SW2, SW3, and SW4 are all turned on. As a result, the input capacitance C0, the feedback capacitances Cf1, Cf2, Cf3, and Cf4, and the amplifier 303 are reset.

At the time point t402, a signal RES input to the pixel 101 releases the reset of the floating diffusion portion 204. In this manner, the floating diffusion portion 204 maintains a voltage that mainly contains noise components generated by the reset operation of the pixel 101. As a result, the pixel 101 outputs a signal (referred to as a noise signal) that mainly contains noise components.

At the time point t403, the switch SW4 is turned off by a signal PFB4 input from the setting circuit 302 to the amplifier circuit 301. The feedback capacitance Cf4 is not connected to the feedback path. In addition, the switch SW3 is turned on. Furthermore, when the combination of the amplification factors of the amplifier circuit 301 corresponds to the setting A, signals PFB1 and PFB2 are not used. For this reason, the signals PFB1 and PFB2 are not illustrated. However, like the switch SW4, the switches SW1 and SW2 are turned off by the signals PFB1 and PFB2 at the time point t403.

At the time point t404, the switch SW5 is turned off in response to the signal PCOR input to the amplifier circuit 301, and the reset of the amplifier circuit 301 is released. The input capacitance C0 holds an electric charge in accordance with the noise signal output from the pixel 101. The signal output from the amplifier circuit 301 after the reset release of the amplifier circuit 301 is a signal mainly containing the offset component of the amplifier circuit 301. This signal is referred to as an "N signal".

A period from time points t416 to t417 is a reset period of the comparator 304. The ramp signal VRAMP generated by the reference signal generation circuit 105 is once raised to a certain offset voltage and, thereafter, the comparator 304 is reset. As a result, a voltage level higher than the reset level of the comparator 304 by the offset voltage is set as the initial voltage of the input node of the ramp signal VRAMP. By setting the offset voltage in this manner, AD conversion is performed in which the beginning part of the change of the ramp signal VRAMP is regarded as the invalid region of AD conversion. The beginning part of the change in the ramp signal VRAMP may have lower linearity than the other parts. The AD conversion accuracy can be improved by regarding this part as an invalid region of AD conversion.

The period from time points t405 to t407 is the AD conversion period of the N signal output from the amplifier circuit 301. Hereinafter, the period is also referred to as an "NAD period". Note that in this example, the N signal of the amplifier circuit 301 is directly input to the comparator 304. As another example, a clamp capacitance may be provided at the input node of the comparator 304 in the same way as the input capacitance C0 is provided at the input node of the amplifier 303. In this case, the N signal is clamped in the clamp capacitance when the comparator 304 is released from reset. Therefore, the reference voltage used for the clamping operation of the clamp capacitance is input during the NAD period.

The signal Vcamp_out is at the level of the N signal. The ramp signal VRAMP output from the reference signal generation circuit 105 starts changing the potential thereof at the time point t405.

At the time point t406, if the ramp signal VRAMP has a larger amplitude than the signal Vcamp_out at the N signal level, the signal level of the signal Vcomp_out changes. The output of the comparator 304 and the counter signal from the counter circuit 106 are input to the column memory 305. In response to a change in the signal Vcomp_out, the N memory 306 stores the count signal. The stored count signal serves as the AD conversion value of the N signal. Hereinafter, the count signal is also referred to as a "digital N signal".

The operation performed during the period from time points t408 to t411, which is the signal decision period, is described below.

During the period from the time points t408 to t409, the vertical scanning circuit 102 sets the signal TX output to the pixel 101 to a high level. This causes the transfer switch 202 to turn on. As a result, the electric charge that corresponds to the incident light and that is accumulated in the photodiode 201 is transferred to the floating diffusion portion 204. At this time, the pixel 101 outputs a signal based on the electric charge generated by the incident light. The signal is referred to as a "photoelectric conversion signal".

The amplifier circuit 301 amplifies the input photoelectric conversion signal with an amplification factor of 4. Note that the signal output by the amplifier circuit 301 after amplifying the photoelectric conversion signal referred to as an "S signal". In addition, hereinafter, in terms of the S signal, the amplification factor applied by the amplifier circuit 301 to the photoelectric conversion signal is also referred to as an "S signal (amplification factor)". That is, the amplified signal obtained when the photoelectric conversion signal is amplified with an amplification factor of 4 may be expressed as an "S signal (4)". Furthermore, when a signal obtained by amplifying a photoelectric conversion signal is expressed regardless of the amplification factor, the signal may be simply referred to as an "S signal". The S signal (4) is output from the amplifier circuit 301 to the comparator 304.

At a time point t410, the voltage of the ramp signal VRAMP output from the reference signal generation circuit 105 begins to rise to the threshold voltage VREF, which is the threshold for signal decision.

Two signals Vcamp_out, one shown as a solid line and the other as a dashed line, at the time point t411 are illustrated. The solid line indicates the case where the photodiode 201 of the pixel 101 has low luminance. That is, at the time point t411, the signal Vcamp_out (the solid line), which is the S signal (4), is less than the reference voltage VREF. In this case, the signal VCOMP_OUT (the solid line) output from the comparator 304, which is a decision signal, is at a low level. Information "J=0" indicating that the decision signal is at the low level is stored in the J memory. In addition, the low level decision signal is input to the setting circuit 302, but the amplification factor of the amplifier circuit 301 is still set to 4.

In contrast, the dashed line representing the signal Vcamp_out at the time point t411 indicates the case where the photodiode 201 of the pixel 101 has high luminance That is, at the time point t411, the signal Vcamp_out (the solid line), which is the S signal (4), is greater than the reference voltage VREF. In this case, the signal VCOMP_OUT (the dashed line) that is output from the comparator 304 and that serves as a decision signal is at the high level. Information "J=1" indicating that the decision signal is at the high level is stored in the J memory. Furthermore, at the time point t411, the setting circuit 302 outputs the signal PFB4 to the amplifier circuit 301 in response to the input of the high level decision signal and turns on the switch SW4. A capacitance of 4C, which is the total capacitance value of the feedback capacitances Cf3 and Cf4, is connected to the feedback path of the amplifier circuit 301, and the amplification factor of the amplifier circuit 301 is changed from 4 to 1.

The period from the time points t412 to t415, which is the AD conversion period of the S signal (hereinafter referred to as an "SAD period"), is described below.

The comparator 304 compares the signal Vcamp_out, which has the signal level of the S signal amplified by the amplifier 301, with the ramp signal VRAMP having a voltage that is output from the reference signal generation circuit 105 and that increases from the time points t412 to t414. If the decision signal is at the low level, the amplification factor of the amplifier circuit 301 during the SAD period remains at 4. At the time point t414, VRAMP>Vcamp_out (the solid line). The signal Vcomp_out changes to the low level due to the change in the magnitude relationship between the S signal (4) and the ramp signal VRAMP. The S memory 307 stores a count signal in response to the change in the signal level of the signal Vcomp_out. The stored count signal serves as the AD conversion value of the S signal. Hereinafter, the stored count signal is also referred to as a "digital S signal".

However, if the decision signal is at the high level, the amplification factor of the amplifier circuit 301 during the SAD period is set to 1. In the case illustrated in FIG. 4, at the time point t413, VRAMP>Vcamp_out (the solid line). The signal Vcomp_out changes to the low level due to the change in the magnitude relationship between the S signal (1) and the ramp signal VRAMP. Like the case where the decision signal is at the low level, the S memory 307 stores the count signal in response to the change in the signal level of the signal Vcomp_out. The stored count signal serves as the AD conversion value of the S signal. The above is the description of the drive timing of each of the units related to acquisition of the digital N signal, the decision signal, and the digital S signal when the combination of the amplification factors of the amplifier circuit 301 is determined by the setting A.

Figure 5:
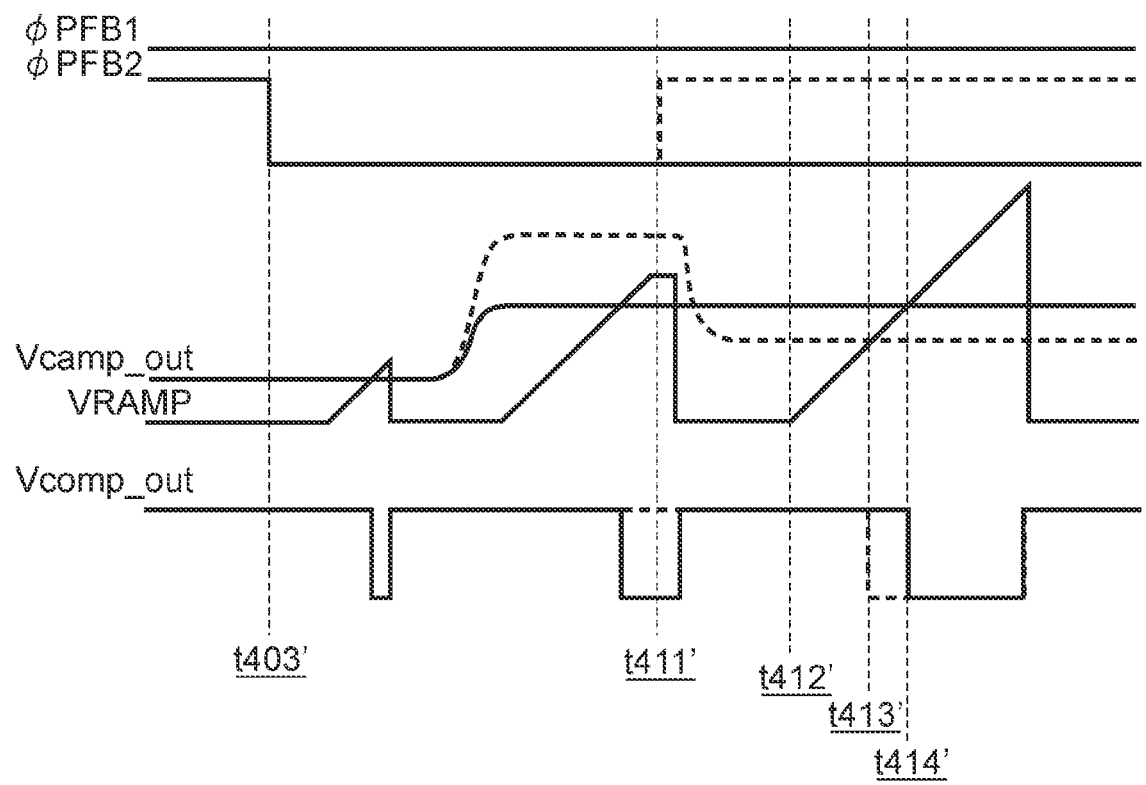
FIG. 5 is a diagram illustrating the operation performed by a reading circuit.

FIG. 5 is a timing diagram of when the combination of the amplification factors of the amplifier circuit 301 is determined by the setting B. In the case of setting B, the operations are the same as those illustrated in FIG. 4 except for the setting operation of the feedback capacitance of the amplifier circuit during the signal decision period. Hereinafter, the operation based on the setting B during the signal decision period is mainly described.

Like FIG. 4, in FIG. 5, the solid line indicates the case where relatively low-luminance light is incident on the pixel 101. The dashed line indicates the case where relatively high-luminance light is incident on the pixel 101.

The operation performed by the amplifier circuit 301 is described below. At a time point t403', the setting circuit 302 connects the feedback capacitance Cf1 to the feedback path, and the other feedback capacitances are not connected to the feedback path. As a result, the amplification factor of the amplifier circuit 301 is set to 8.

If the decision signal is at the low level, the setting circuit 302 keeps the amplification factor of the amplifier circuit 301 at 8.

However, if the decision signal is at the high level, the setting circuit 302 outputs the signal PFB2 to the amplifier circuit 301 at a time point t411'. As a result, the switch SW2 is turned on, and the feedback capacitance Cf2 is further connected to the feedback path. As a result, the capacitance value connected to the feedback path becomes Cf1+Cf2=4C. That is, the amplification factor of the amplifier circuit 301 is changed from 8 to 2.

AD conversion is described below. If the decision signal is at the low level, the amplification factor of the amplifier circuit 301 in the SAD conversion remains at 8. In the example illustrated in FIG. 5, in the case of the solid line (the decision signal is at the low level), the digital S signal, which is the count signal corresponding to the time point t414' at which VRAMP>Vcamp_out (the solid line), is obtained. If the decision signal is at the low level, the amplification factor of the amplifier circuit 301 in the SAD conversion is set to 2. In the example illustrated in FIG. 5, in the case of the solid line (the decision signal is at a low level), the digital S signal, which is the count signal corresponding to the time point t413' at which VRAMP>Vcamp_out (the dashed line) is obtained.

Correction of Digital Signal

A correction method for correcting the difference in resolution of AD conversion in the signal processing unit 109 is described with reference to FIG. 6. The difference in resolution is caused by the difference in the amplification factor of the amplifier circuit 301.

A method is described first for obtaining a corrected AD conversion value corresponding to the light incident on the photodiode 201 by using the digital N signal, the decision signal, and the digital S signal transferred from the column memory 305 to the signal processing unit 109.

Figure 6:
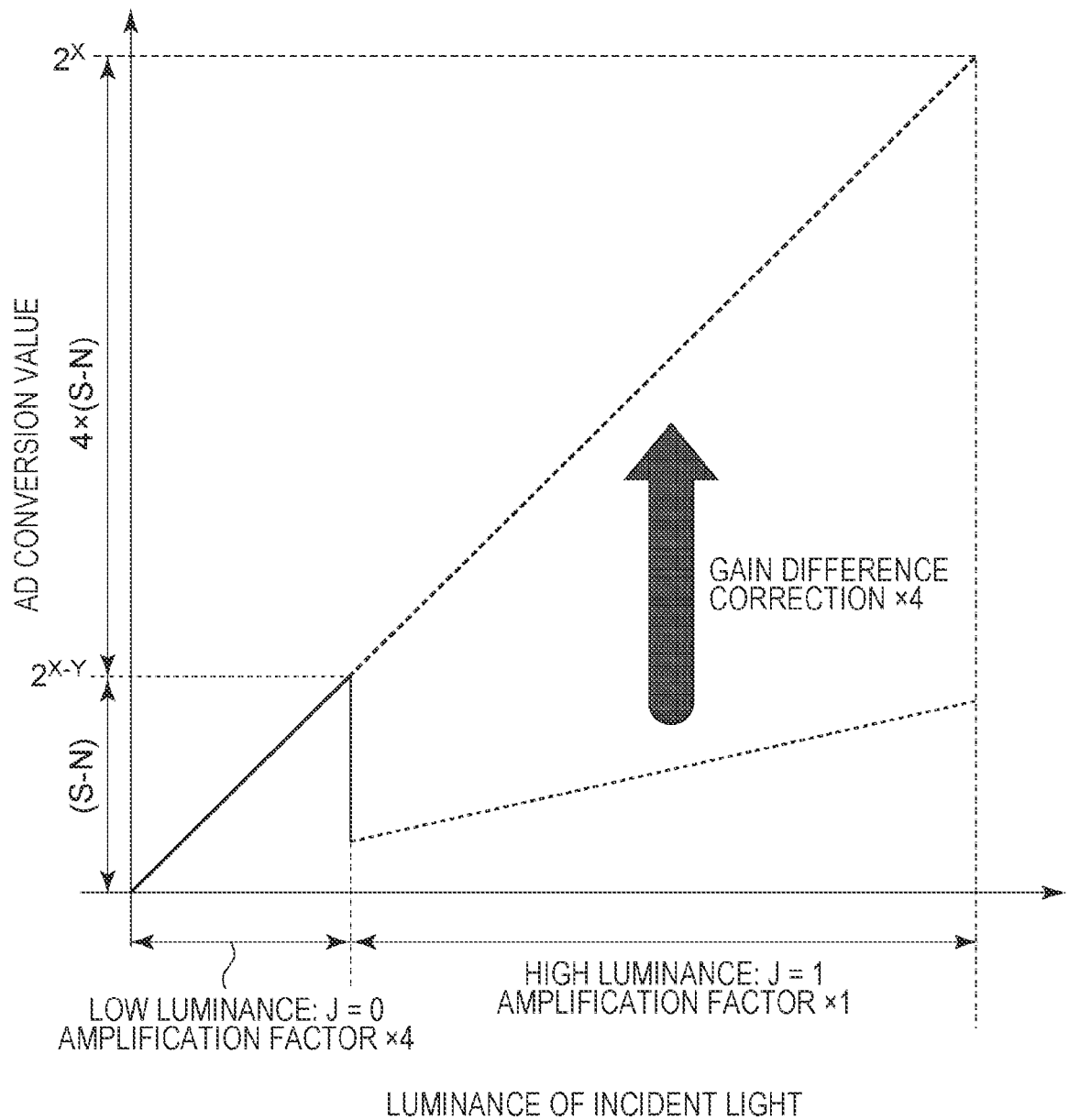
FIG. 6 is a diagram describing a resolution correction.

In the graph of FIG. 6, the abscissa represents the luminance of the light incident on the photodiode 201, and the ordinate represents the AD conversion value (the corrected digital signal value) output from the signal processing unit 109. The signal processing unit 109 obtains the difference between the digital N signal and the digital S signal by arithmetic processing. As a result, a digital (S−N) signal is obtained by subtracting a noise component from the digital S signal.

The digital (S−N) signal has an AD conversion value shown as a thin dashed line in FIG. 6. In a correction to make the resolutions of the digital signals the same (hereinafter, also referred to as a "digital correction"), the digital (S−N) signal is multiplied by a value 2Y, which is the ratio between the amplification factors switched around by the amplifier circuit 301. In both the cases where the combination of the amplification factors of the amplifier circuit 301 is the setting A and where the combination is the setting B, the value 2Y=4/1=8/2=4. At this time, Y is the number of extension bits. The corrected AD conversion value is 4×(S−N). The corrected AD conversion value is output from the signal processing unit 109. The resolution of the digital signal is in the units of 4 LSB (Least Significant Bit), but the dynamic range is expanded. In contrast, when the decision signal indicates J=0, the process of obtaining the digital (S−N) signal is performed. However, the process of correcting the resolution of the digital signal is not performed. As a result, the AD conversion value shown as the solid line in FIG. 6 is obtained through the arithmetic processing performed by the signal processing unit 109, and the AD conversion value is output from the signal processing unit 109.

In this manner, expansion of the dynamic range can be achieved on the basis of the bit extension method in which the resolution is high on the low-luminance side, and the dynamic range is expanded on the high-luminance side although the resolution is decreased.

Correction of Amplification Factor Error and Offset Error

The S signal contains an offset component because the ratio between the amplification factors of the amplifier circuit 301 has an error in the design value due to the manufacturing error in the image sensing apparatus and because the switching noise occurs when the switch located in the feedback path operates. For this reason, at the boundary between the low-luminance output and the high-luminance output illustrated in FIG. 6, there is a difference in the AD conversion value between the case of J=0 and the case of J=1. As a result, the linearity (the relationship between the AD conversion value and the incident light luminance) is reduced, which is problematic in terms of the image quality (that is, the correct luminance is not expressed). For this reason, the difference in the AD conversion value is corrected. An error correction method is described with reference to the case where the combination of the amplification factors of the amplifier circuit 301 is the setting A and FIGS. 7A and 7B.

Figure 7A:
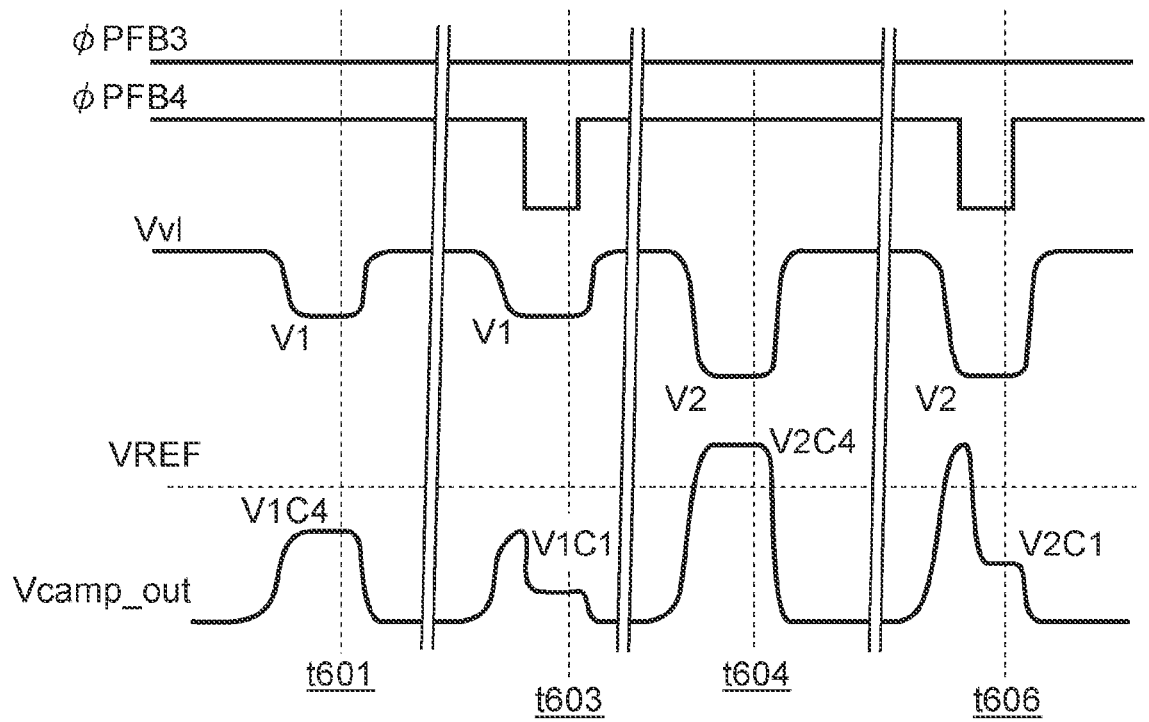
FIGS. 7A and 7B illustrate a correction value acquisition operation and an error correction.

Acquisition of the correction value used for an error correction is performed using the blanking period in which no readout operation is performed in the image frame. FIG. 7A illustrates the relationship between a predetermined voltage output from the voltage output circuit 111 to the output line and a correction signal obtained by amplifying a predetermined signal output from the voltage output circuit 111 by the amplifier circuit 301. When the switch SW6 is turned off, the output line 103 is disconnected from the pixel 101. The setting circuit 302 controls the voltage output circuit 111 to output predetermined signals corresponding to the setting A for the combination of the amplification factors of the amplifier circuit 301. More specifically, the setting circuit 302 instructs the voltage output circuit 111 to output test voltage values V1 and V2, which are the predetermined signals having different signal levels from each other. The test voltage values V1 and V2 are amplified by the amplifier circuit 301 with amplification factors of 4 and 1, respectively. Let V1C4 be the output of the test voltage value V1 amplified by the amplifier 303 with an amplification factor of 4, and let V1C1 be the output of the test voltage value V1 amplified by the amplifier 303 with an amplification factor of 1. Similarly, let V2C4 be the output of the test voltage value V2 amplified by the amplifier 303 with an amplification factor of 4, and let V2C1 be the output of the test voltage value V2 amplified by the amplifier 303 with an amplification factor of 1. Then, it is desirable that the reference voltage value VREF used for signal decision be included in the signal level between the test voltage values V1C4 and V2C4, as follows:

$$V1C4 \leq VREF \leq V2C4 \tag{1}.$$

The test voltage values V1 and V2 are set so as to satisfy inequality (1). In this manner, among the signal ranges output from the amplifier circuit 301 in the actual imaging sensing operation, a correction value corresponding to a wider signal range can be obtained. The outputs V1C4, V1C1, V2C4, and V2C1 are AD-converted by the AD conversion circuit 311 at time points t601, t603, t604, and t606, respectively. As a result, correction signals A1, B1, A2, and B2 are obtained. In the setting A, it is desirable that the setting be made so that the test voltage value amplified with an amplification factor of 4 is within the voltage change range of the ramp signal VRAMP. That is, it is desirable that the setting be made so that the test voltage does not deviate from the AD-convertible range for the high amplification factor in the combination of the switched amplification factors of the amplifier circuit. As can be seen the ordinate in FIG. 6, when the AD conversion value by bit extension is 2X and the number of extension bits is Y, the output saturation is 2(X−Y). Accordingly, the test voltage is set so that the correction signal A2 is less than or equal to 2(X−Y).

Figure 7B:
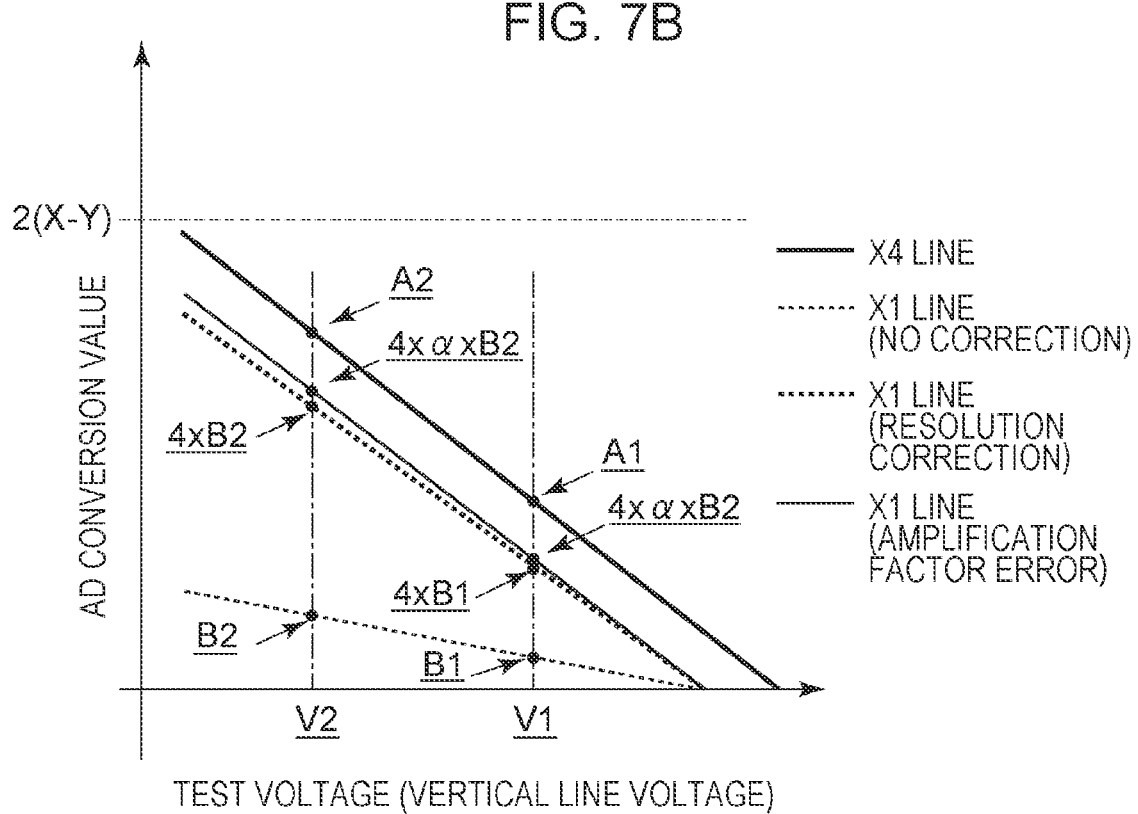

A method for acquiring the correction value is described with reference to FIG. 7B. FIG. 7B illustrates an example in which the signal processing unit 109 is a correction value acquisition unit that performs correction and acquisition. However, the configuration is not limited to the example. The correction value acquisition unit may be provided outside the image sensing apparatus.

The signal processing unit 109 acquires a correction value α for correcting an error in the amplification factor. The correction value α is acquired from the ratio between the AD conversion output inclinations for the amplification factors to be compared. The output inclination when the amplification factor is 4 is (A2−A1) (the thick solid line in FIG. 7B), and the inclination when the resolution is corrected and the amplification factor is 1 is 4×(B2−B1) (the thick dashed line in FIG. 7B). Therefore, the correction value α can be obtained as follows:

$$\alpha = (A2-A1)/4 \times (B2-B1) \tag{2}.$$

A correction value β, which is an offset correction value, can be calculated from the difference between the two values at the same test voltage value that are AD-converted with the two amplification factors to be compared and that are corrected using by using the correction value. That is, comparison is made between the point A1 and the point 4×α×B2 or between the point A2 and the point 4×α×B2 in FIG. 7B. In the former example, the correction value β corresponding to the offset correction can be obtained as follows:

$$\beta = A1 - 4 \times \alpha \times B1 \tag{3}.$$

From the above, in the case of the signal decision value indicating high luminance (J=1), the signal processing unit 109 corrects the (S−N) AD conversion value by using the correction values α and β as follows:

$$DH = 4\alpha \times (S-N) + \beta (J=1) \tag{4}.$$

In addition, if the decision signal indicates that J=0, the correction process need not be performed as follows:

$$DL = S - N (J=0) \tag{5}.$$

Through the correction, excellent linearity can be obtained in the AD conversion value at the boundary in which the amplification factor of the amplifier circuit 301 is switched around. The signal processing unit 109 performs correction processing on the digital (S−N) signal on the basis of the correction signal updated at each image capture performed by the image sensing apparatus. That is, the signal processing unit 109 according to the present embodiment is not only a correction value acquisition unit but also a correction unit that performs correction processing on the digital (S−N) signal. Note that when the correction value acquisition unit is provided outside the image sensing apparatus, the signal processing unit 109 can be used as the correction unit. Alternatively, both the correction value acquisition unit and the correction unit can be provided outside the image sensing apparatus. Note that when the correction value acquisition unit and the correction unit are provided outside the image sensing apparatus, a signal processing unit 1007 (according to a second embodiment described below) to which the signal of the image sensing apparatus is output may serve as the correction value acquisition unit and the correction unit.

The above is the description of the method for acquiring and applying the correction value α and correction value β for the setting A.

Figure 8:
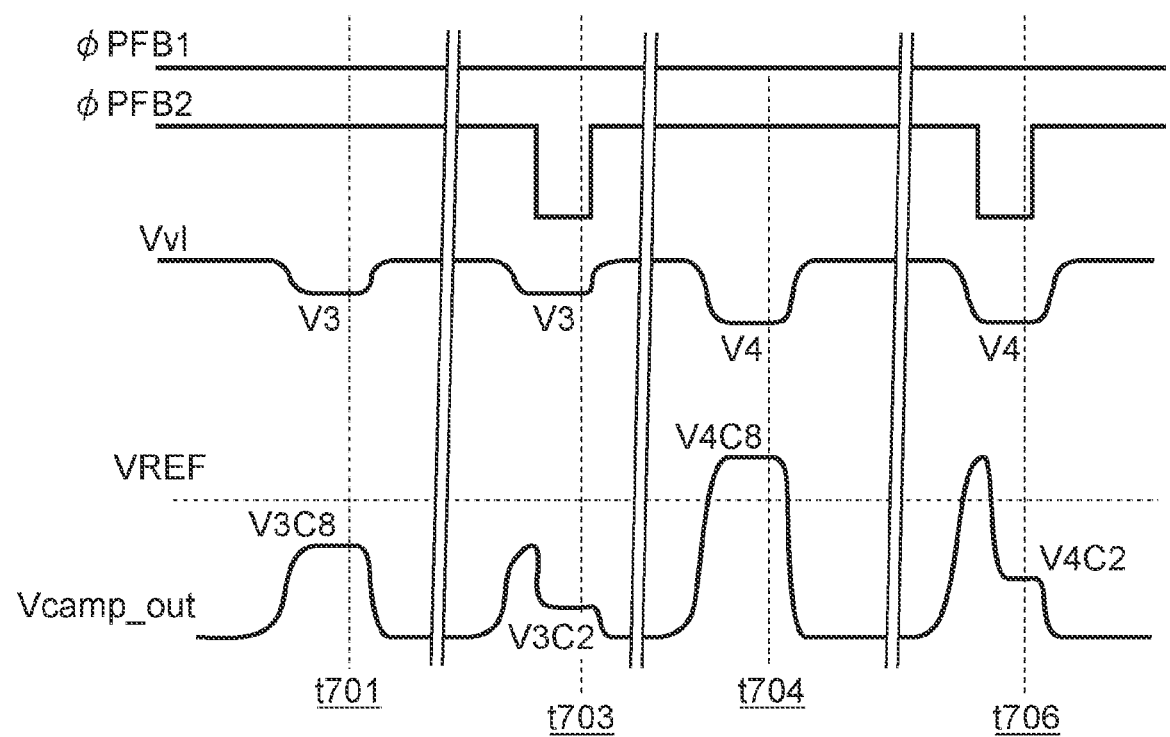
FIG. 8 illustrates a correction value acquisition operation.

A method for acquiring the correction value is described with reference to the case where the combination of the amplification factors of the amplifier circuit 301 is the setting B and FIG. 8. FIG. 8 illustrates the relationship between a test voltage value input from the voltage output circuit 111 to the output line and the correction signal amplified by the amplifier circuit for the setting B.

In the setting B, the amplification factor of the amplifier circuit 301 is set so as to be higher than that in the setting A. For this reason, the test voltage value output from the voltage output circuit 111 is amplified with an amplification factor higher than that of the setting A. At this time, as described in the example of the setting A, if the test voltage value amplified by the amplifier circuit 301 is outside of the voltage change range of the ramp signal VRAMP compared by the comparator 304 for AD conversion, a correct digital signal cannot be obtained. Therefore, similarly to the setting A, the test voltage is set so that the correction signal is less than or equal to 2(X−Y) in consideration of the change amount of the amplification factor. Accordingly, the setting circuit 302 instructs the voltage output circuit 111 to output the test voltage values V3 and V4 corresponding to the setting B. At this time, since the amplification factor of the amplifier circuit 301 of the setting B is higher than that of the setting A, the test voltage values V3 and V4 set for not deviating from the above-mentioned AD convertible signal range are less than or equal to the test voltage values V1 and V2, respectively. Thus, the following inequality is satisfied:

$$(V1/V2) > (V3/V4) \tag{6}.$$

However, V1 may be equal to V3 or V4. That is, V1, which is the first level, may be equal to V3, which is the third level, or V4, which is the fourth level. Alternatively, V1, which is the first level, V2, which is the second level, V3, which is the third level, and V4, which is the fourth level, may differ from one another.

The test voltage values V3 and V4 are amplified by the amplifier circuit 301 with an amplification factor of 8 and 2, respectively. Let V3C8 denote the output obtained by amplifying the test voltage value V3 with an amplification factor of 8, and let V3C2 denote the output obtained by amplifying the test voltage value V3 with an amplification factor of 2. Similarly, let V4C8 denote the output obtained by amplifying the test voltage value V4 with an amplification factor of 8, and let V4C2 denote the output obtained by amplifying the test voltage value V4 with an amplification factor of 2. Then, the output V3C8 and the output V4C8 obtained by amplifying the test voltage value by the amplifier circuit 301 with an amplification factor of 8 include the reference voltage value VREF used for signal decision as follows:

$$V3C8 \leq VREF \leq V4C8 \quad (7)$$

In addition, as illustrated in inequalities (2), the correction value α is obtained from the ratio between the inclinations of the AD conversion outputs. Therefore, it is desirable that the output V3C2 and the output V4C2, which are obtained by amplifying the test voltage values when the amplification factor of the amplifier circuit 301 is 2 and are output, be set so that the inclination of the output becomes large at the correction value α. In this way, even when as in the setting B, the amplification factor is higher than that of the setting A, a digital signal having a reduced amplification factor error can be obtained through the correction processing using the correction value α.

The outputs V3C8, V3C2, V4C8, and V4C2 are AD-converted at time points t701, t703, t704, and t706 to obtain the correction signals A3, A4, B3, and B4, respectively.

The procedure for acquiring the correction value α and the correction value β from the correction signal is the same as in the combination setting A of the amplification factor of the amplifier circuit 301. The equations for obtaining the correction values α and β are as below:

$$\alpha = (A4 - A3)/4 \times (B4 - B3) \quad (8), \text{ and}$$

$$\beta = A3 - 4 \times \alpha \times B3 \quad (9).$$

As described above, if the decision signal indicates that J=1, the signal processing unit 109 corrects the digital (S−N) signal by using the above-described equations (7) and (8) using the correction values α and β.

In this way, even if the setting B is employed that has higher amplification factors to be switched around by the amplifier circuit 301 than those of the setting A, an excellent output characteristics similar to those of setting A can be obtained by appropriately changing the test voltage value set by the voltage output circuit 111.

The present embodiment is merely a particular example of the, and the scope of the disclosure is not limited to the configuration of the above-described embodiment. For example, the voltage output circuit 111 may be an external voltage value input unit or a unit that internally generates a voltage value by dividing the voltage of a power supply. The correction of the digital (S−N) signal may be a fixed value correction in which the signal output unit 110 outputs a correction signal to the outside of the image sensing apparatus and inputs a calculated correction value to the signal processing unit 109. The test voltage value may be set to any value regardless of the signal decision voltage value VREF. Even in such an embodiment, the same effect as that described in the first embodiment can be obtained.

Furthermore, according to the present embodiment, the AD conversion circuit 311 that converts the output of the amplifier circuit 301 into a digital signal is provided. However, the disclosure is not limited to the example. The signal output from the amplifier circuit 301 may be output to the outside of the image sensing apparatus in the analog format. Even in this embodiment, the amplifier circuit 301 can output the signal so that the signal is within a range processible by a circuit following stage of the amplifier circuit.

Second Embodiment

Figure 9:
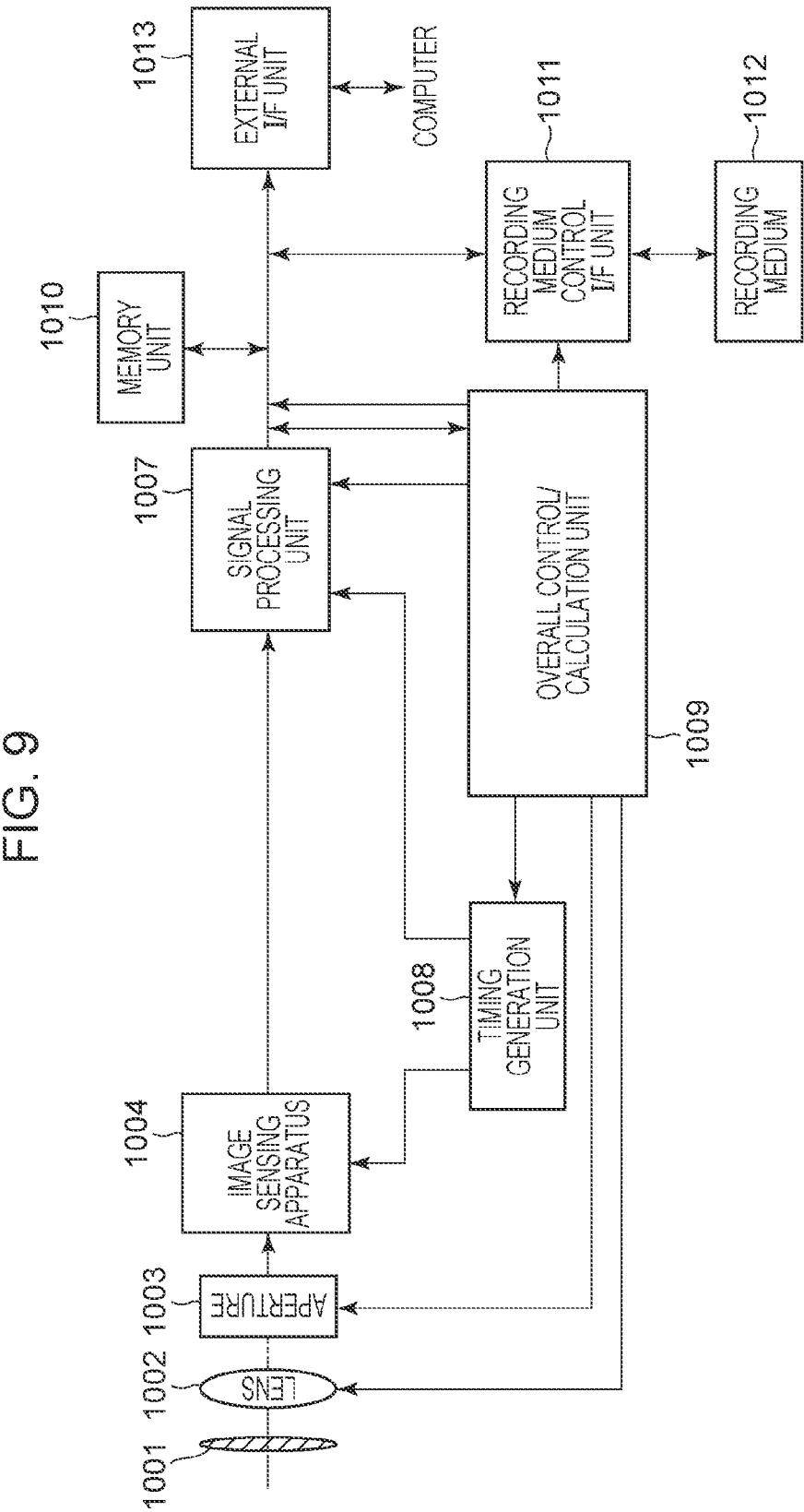
FIG. 9 illustrates the configuration of a photoelectric conversion system.

A photoelectric conversion system according to the present embodiment is described with reference to FIG. 9. FIG. 9 is a block diagram schematically illustrating the configuration of the photoelectric conversion system according to the present embodiment.

The photoelectric conversion apparatus (the image sensing apparatus) described in the first embodiment is applicable to a variety of photoelectric conversion systems. Examples of an applicable photoelectric conversion system include a digital still camera, a digital camcorder, a surveillance camera, a copier, a fax machine, a mobile phone, an on-vehicle camera, and an observation satellite. Note that a camera module including an optical system, such as a lens and an image sensing apparatus, is further included in the photoelectric conversion system. FIG. 9 is a block diagram of a digital still camera, which is one of the above-mentioned examples.

The photoelectric conversion system illustrated in FIG. 9 as an example includes an image sensing apparatus 1004, a lens 1002 that forms the optical image of an object on the image sensing apparatus 1004, an aperture 1003 for varying the amount of light passing through the lens 1002, and a barrier 1001 that protects the lens 1002. The lens 1002 and the aperture 1003 form an optical system that collects light on the image sensing apparatus 1004. The image sensing apparatus 1004 is the photoelectric conversion apparatus (the image sensing apparatus) according to any one of the above-described embodiments. The image sensing apparatus 1004 converts an optical image formed by the lens 1002 into an electric signal.

The photoelectric conversion system further includes a signal processing unit 1007, which is an image generation unit that generates an image by processing an output signal output from the image sensing apparatus 1004. The signal processing unit 1007 operates to perform a variety of corrections and compressions as necessary and output image data. The signal processing unit 1007 may be formed on a semiconductor substrate having the image sensing apparatus 1004 provided thereon, or may be formed on a semiconductor substrate different from the image sensing apparatus 1004. Alternatively, the image sensing apparatus 1004 and the signal processing unit 1007 may be formed on the same semiconductor substrate.

The photoelectric conversion system further includes a memory unit 1010 that temporarily stores image data and an external interface unit (an external I/F unit) 1013 that communicates with an external computer or the like. Still furthermore, the photoelectric conversion system includes a recording medium 1012, such as a semiconductor memory, that allows captured image data to be stored therein or read out therefrom and a recording medium control interface unit (a recording medium control I/F unit) 1011 used to store or read out the captured imaging data to or from the recording medium 1012. Note that the recording medium 1012 may be built in the photoelectric conversion system or may be removable from the photoelectric conversion system.

Yet still furthermore, the photoelectric conversion system includes an overall control/calculation unit 1009 that performs a variety of types of calculation and performs overall control of the digital still camera and a timing generation unit 1008 that outputs a variety of timing signals to the image sensing apparatus 1004 and the signal processing unit 1007. The timing signals or the like may be input from the outside, and the photoelectric conversion system is required to include at least an image sensing apparatus 1004 and a signal processing unit 1007 that processes an output signal output from the image sensing apparatus 1004.

The image sensing apparatus 1004 outputs an imaging signal to the signal processing unit 1007. The signal processing unit 1007 performs predetermined signal processing on the imaging signal output from the image sensing apparatus 1004 and outputs image data. The signal processing unit 1007 uses the imaging signal to generate an image.

As described above, the present embodiment can provide a photoelectric conversion system to which the photoelectric conversion apparatus (the image sensing apparatus) according to any of the above-described embodiments is applied.

Third Embodiment

Figure 10A:
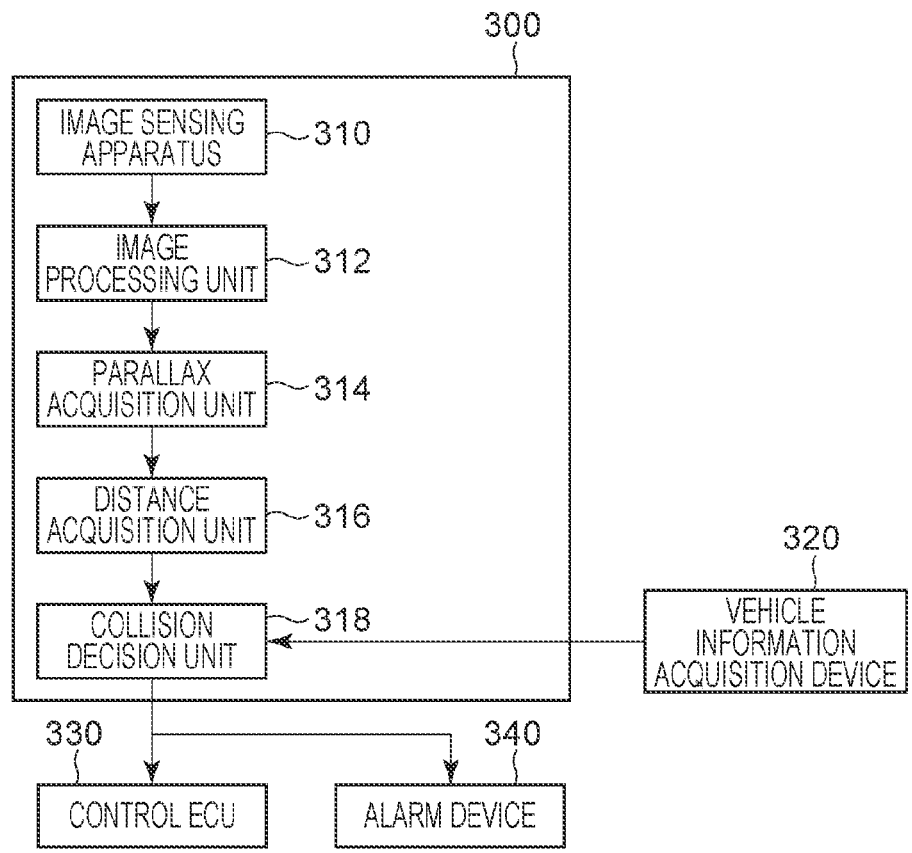
FIGS. 10A and 10B illustrate the configuration of a moving object and the operation performed by the moving object.
Figure 10B:
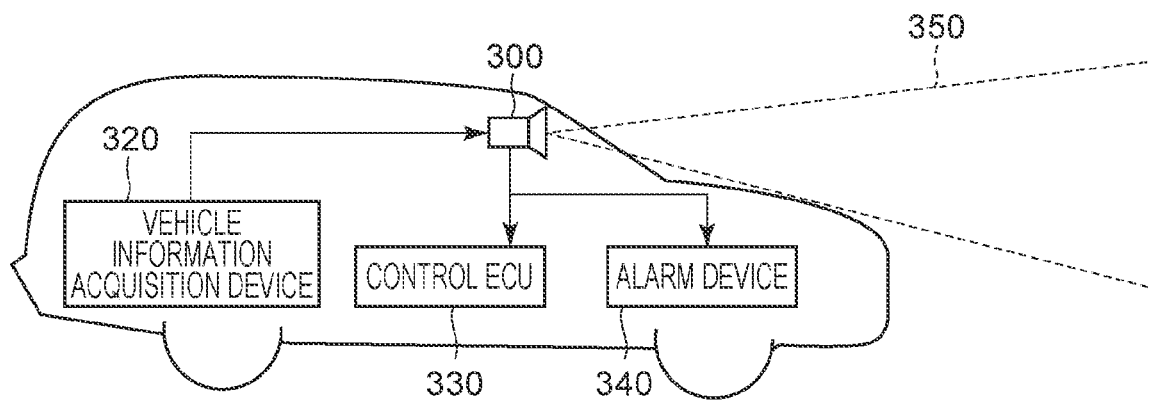

A photoelectric conversion system and a moving object according to the present embodiment are described with reference to FIGS. 10A and 10B. FIGS. 10A and 10B illustrate the configurations of the photoelectric conversion system and the moving object according to the present embodiment, respectively.

FIG. 10A illustrates an example of the photoelectric conversion system related to an on-vehicle camera. A photoelectric conversion system 300 includes an image sensing apparatus 310. The image sensing apparatus 310 is the photoelectric conversion apparatus (the image sensing apparatus) according to any one of the above-described embodiments. The photoelectric conversion system 300 includes an image processing unit 312 that performs image processing on a plurality of image data acquired by the image sensing apparatus 310 and a parallax acquisition unit 314 that calculates the parallax (the phase difference of a parallax image) from the plurality of image data acquired by the photoelectric conversion system 300. The photoelectric conversion system 300 further includes a distance acquisition unit 316 that calculates the distance to a target object on the basis of the calculated parallax and a collision decision unit 318 that determines whether there is a possibility of collision on the basis of the calculated distance. Note that the parallax acquisition unit 314 and the distance acquisition unit 316 are an example of a distance information acquisition unit that acquires information about the distance to a target object. That is, the distance information is information regarding the parallax, defocus amount, distance to a target object, or the like. The collision decision unit 318 may determine the possibility of collision by using any one of these distance information items. The distance information acquisition unit may be configured by dedicatedly designed hardware or a software module. Alternatively, the distance information acquisition unit may be configured by a field programmable gate array (FPGA), an application specific integrated circuit (ASIC), or the like, or may be configured by combinations thereof.

The photoelectric conversion system 300 is connected to a vehicle information acquisition device 320 and can acquire vehicle information, such as the vehicle speed, yaw rate, and steering angle. In addition, the photoelectric conversion system 300 is connected to a control ECU 330 which is a control unit that outputs a control signal for generating a braking force applied to the vehicle on the basis of the decision result from the collision decision unit 318. In addition, the photoelectric conversion system 300 is connected to an alarm device 340 that issues an alarm to the driver on the basis of the decision result from the collision decision unit 318. For example, when there is a high probability of collision in the decision result from the collision decision unit 318, the control ECU 330 controls the vehicle to avoid the collision or reduce damage by applying the brake, returning the accelerator pedal, reducing the engine output, and the like. The alarm device 340 warns the user by sounding an alarm, such as a sound, displaying alarm information on the screen of a car navigation system or the like, or transmitting vibration to the seat belt or a steering wheel.

According to the present embodiment, the area near the vehicle, for example, the area in front or back of the vehicle is imaged by the photoelectric conversion system 300. FIG. 10B illustrates a photoelectric conversion system for imaging the area in front of the vehicle (an imaging range 350). The vehicle information acquisition device 320 sends an instruction to the photoelectric conversion system 300 or the image sensing apparatus 310. Such a configuration can increase the accuracy of distance measurement more.

While an example of control performed to avoid collision with another vehicle has been described above, the configuration is applicable to self-driving control to follow another vehicle or self-driving control to keep the vehicle centered within the lane. Furthermore, the photoelectric conversion system can be applied to not only vehicles, such as an automobile, but also a moving object (a mobile apparatus), such as a vessel, an aircraft, and an industrial robot. Still furthermore, the photoelectric conversion system can be applied to not only a moving object but also a wide range of apparatuses that use object recognition, such as an intelligent transportation system (ITS).

Modification of Embodiments

The disclosure is not limited to the above embodiments, and a variety of modifications can be made.

For example, an example in which a part of the configuration of any one of the embodiments is added to another embodiment or an example in which a part of the configuration of any one of the embodiments is replaced with a part of configuration of another embodiment is embraced within an embodiment of the disclosure.

In addition, each of the photoelectric conversion systems according to the second embodiment and the third embodiment is an example of a photoelectric conversion system to which the photoelectric conversion apparatus can be applied, and the photoelectric conversion system to which the photoelectric conversion apparatus according to the disclosure can be applied is not limited to the configurations illustrated in FIG. 9 and FIGS. 10A and 10B.

It should be noted that all of the above embodiments are merely examples of embodiments of the disclosure, and the technical scope of the disclosure should not be interpreted in a limited manner by these embodiments. That is, the disclosure can be embodied in various ways without deviating from its technical concept or its main features.

A correction process corresponding to the amplification factor set in an amplifier circuit in accordance with the level of a pixel signal can be performed in an optimum way.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-178126 filed Oct. 23, 2020, which is hereby incorporated by reference herein in its entirety.

What is claimed is:

1. A photoelectric conversion apparatus comprising:
a pixel configured to output a pixel signal in accordance with an amount of incident light;
an amplifier circuit configured to amplify the pixel signal with an amplification factor in accordance with a signal level of the pixel signal;
a voltage output circuit configured to output a predetermined signal to the amplifier circuit; and
a setting circuit configured to set a signal level of the predetermined signal in accordance with the amplification factor set by the amplifier circuit,
wherein when the amplification factor in accordance with the signal level of the pixel signal is a first amplification factor, the setting circuit sets the signal level of the predetermined signal to each of a first level and a second level that differs from the first level, and
wherein when the amplification factor in accordance with the signal level of the pixel signal is a second amplification factor that differs from the first amplification factor, the setting circuit sets the signal level of the predetermined signal to each of a third level and a fourth level that differs from the third level.

2. The photoelectric conversion apparatus according to claim 1, wherein the first level is the same as the third level.

3. The photoelectric conversion apparatus according to claim 1, wherein the first level, the second level, the third level, and the fourth level are signal levels that differ from one another.

4. The photoelectric conversion apparatus according to claim 1, wherein the voltage output circuit outputs the predetermined signals of the first level and the second level to the amplifier circuit so that the amplifier circuit outputs a first signal and a second signal, respectively, and
wherein the voltage output circuit outputs the predetermined signals of the third level and the fourth level to the amplifier circuit so that the amplifier circuit outputs a third signal and a fourth signal, respectively.

5. The photoelectric conversion apparatus according to claim 2, wherein the voltage output circuit outputs the predetermined signals of the first level and the second level to the amplifier circuit so that the amplifier circuit outputs a first signal and a second signal, respectively, and
wherein the voltage output circuit outputs the predetermined signals of the third level and the fourth level to the amplifier circuit so that the amplifier circuit outputs a third signal and a fourth signal, respectively.

6. The photoelectric conversion apparatus according to claim 3, wherein the voltage output circuit outputs the predetermined signals of the first level and the second level to the amplifier circuit so that the amplifier circuit outputs a first signal and a second signal, respectively, and
wherein the voltage output circuit outputs the predetermined signals of the third level and the fourth level to the amplifier circuit so that the amplifier circuit outputs a third signal and a fourth signal, respectively.

7. The photoelectric conversion apparatus according to claim 4, further comprising:
a correction value acquisition unit configured to acquire a first correction value corresponding to the first amplification factor by using the first signal and the second signal
and acquire a second correction value corresponding to the second amplification factor by using the third signal and the fourth signal.

8. The photoelectric conversion apparatus according to claim 7, further comprising:
a correction unit configured to correct a signal based on the pixel signal by using the first correction value and the second correction value.

9. The photoelectric conversion apparatus according to claim 7, further comprising:
an AD conversion circuit configured to convert a signal output from the amplifier circuit into a digital signal,
wherein an amplitude of each of the first signal, the second signal, the third signal, and the fourth signal is less than an AD convertible signal range of the AD conversion circuit.

10. The photoelectric conversion apparatus according to claim 4, wherein the pixel signal is compared with a threshold, and the amplification factor is set on a basis of a result of the comparison, and
wherein the threshold is each of an amplitude between the first signal and the second signal and an amplitude between the third signal and the fourth signal.

11. A photoelectric conversion system comprising:
the photoelectric conversion apparatus according to claim 1; and
a signal processing unit configured to generate an image by using a signal output from the photoelectric conversion apparatus.

12. A moving object comprising:
the photoelectric conversion apparatus according to claim 1; and
a control unit configured to control movement of the moving object by using a signal output from the photoelectric conversion apparatus.

13. A photoelectric conversion apparatus comprising:
a pixel configured to output a pixel signal in accordance with an amount of incident light;
an amplifier circuit configured to amplify the pixel signal with an amplification factor in accordance with a signal level of the pixel signal;
a voltage output circuit configured to output a predetermined signal to the amplifier circuit; and
a setting circuit configured to set a signal level of the predetermined signal in accordance with the amplification factor set by the amplifier circuit and output an instruction signal of the signal level of the predetermined signal to the voltage output circuit.

14. The photoelectric conversion apparatus according to claim 13,
wherein when the amplification factor in accordance with the signal level of the pixel signal is a first amplification factor, the setting circuit sets the signal level of the predetermined signal to each of a first level and a second level that differs from the first level, and
wherein when the amplification factor in accordance with the signal level of the wherein when the amplification factor in accordance with the signal level of the pixel signal is a second amplification factor that differs from the first amplification factor, the setting circuit sets the signal level of the predetermined signal to each of a third level and a fourth level that differs from the third level.

15. The photoelectric conversion apparatus according to claim 14, wherein the first level is the same as the third level.

16. The photoelectric conversion apparatus according to claim 14, wherein the first level, the second level, the third level, and the fourth level are signal levels that differ from one another.

17. The photoelectric conversion apparatus according to claim 14,
 wherein the voltage output circuit outputs the predetermined signals of the first level and the second level to the amplifier circuit so that the amplifier circuit outputs a first signal and a second signal, respectively, and
 wherein the voltage output circuit outputs the predetermined signals of the third level and the fourth level to the amplifier circuit so that the amplifier circuit outputs a third signal and a fourth signal, respectively.

18. A photoelectric conversion system comprising:
 the photoelectric conversion apparatus according to claim 13; and
 a signal processing unit configured to generate an image by using a signal output from the photoelectric conversion apparatus.

19. A moving object comprising:
 the photoelectric conversion apparatus according to claim 13; and
 a control unit configured to control movement of the moving object by using a signal output from the photoelectric conversion apparatus.

* * * * *